(12) United States Patent
Taets

(10) Patent No.: US 10,391,522 B2
(45) Date of Patent: Aug. 27, 2019

(54) CLEANING DEVICE FOR A PROCESSING PLATEN PRESS

(71) Applicant: Bobst Mex SA, Mex (CH)

(72) Inventor: Serge Taets, Gierle (BE)

(73) Assignee: BOBST MEX SA (CH)

( * ) Notice: Subject to any disclaimer, the term of this patent is extended or adjusted under 35 U.S.C. 154(b) by 94 days.

(21) Appl. No.: 15/121,906

(22) PCT Filed: Feb. 25, 2015

(86) PCT No.: PCT/EP2015/025009
§ 371 (c)(1),
(2) Date: Aug. 26, 2016

(87) PCT Pub. No.: WO2015/128096
PCT Pub. Date: Sep. 3, 2015

(65) Prior Publication Data
US 2017/0014870 A1      Jan. 19, 2017

(30) Foreign Application Priority Data

Feb. 27, 2014   (EP) ...................................... 1400694

(51) Int. Cl.
*B08B 1/04*        (2006.01)
*B29C 33/72*       (2006.01)
(52) U.S. Cl.
CPC ................ *B08B 1/04* (2013.01); *B29C 33/72* (2013.01)
(58) Field of Classification Search
CPC .................................. B29C 33/72; B08B 1/04

USPC ......................... 15/97.1, 102, 88.2; 425/229
See application file for complete search history.

(56) References Cited

U.S. PATENT DOCUMENTS

| | | | | |
|---|---|---|---|---|
| 2,722,090 A | * | 11/1955 | Hasselquist | B24B 23/08 451/356 |
| 4,546,574 A |  | 10/1985 | Blossick et al. | |
| 4,935,981 A | * | 6/1990 | Ohtani | H01L 21/67046 15/88.2 |
| 5,176,075 A |  | 1/1993 | Vegue | |
| 6,705,930 B2 | * | 3/2004 | Boyd | B24B 37/042 451/286 |

(Continued)

FOREIGN PATENT DOCUMENTS

| | | |
|---|---|---|
| DE | 198 19 640 A1 | 11/1999 |
| FR | 2 782 027 A1 | 2/2000 |
| WO | WO 02/49496 A1 | 6/2002 |

*Primary Examiner* — Laura C Guidotti
(74) *Attorney, Agent, or Firm* — Ostrolenk Faber LLP

(57) ABSTRACT

A device (100) for cleaning a platen of a platen press (1), the platen press (1) has a lower and an upper platen (11, 12) of which at least one is movable towards the other. The device (100) includes a frame (110) having a base (172) defining a base plane substantially parallel to a surface on which the frame (110) is positioned, a lift member (120) arranged to the frame (110) such that a relative movement can be executed between the frame (110) and the lift member (120) in a direction substantially perpendicular to the base plane, a pneumatic lifting device (178) for moving the frame (110) relative to the lift member (120), and a rotating element (130) arranged on the lift member (120) and configured to rotate around an axis substantially parallel to the direction of relative movement between the frame (110) and the lift member (120).

16 Claims, 14 Drawing Sheets

(56) References Cited

U.S. PATENT DOCUMENTS

2010/0215471 A1* 8/2010 Younce, Sr. .............. B66F 7/14
                                                                  414/785
2011/0286820 A1    11/2011 Chiari et al.

* cited by examiner

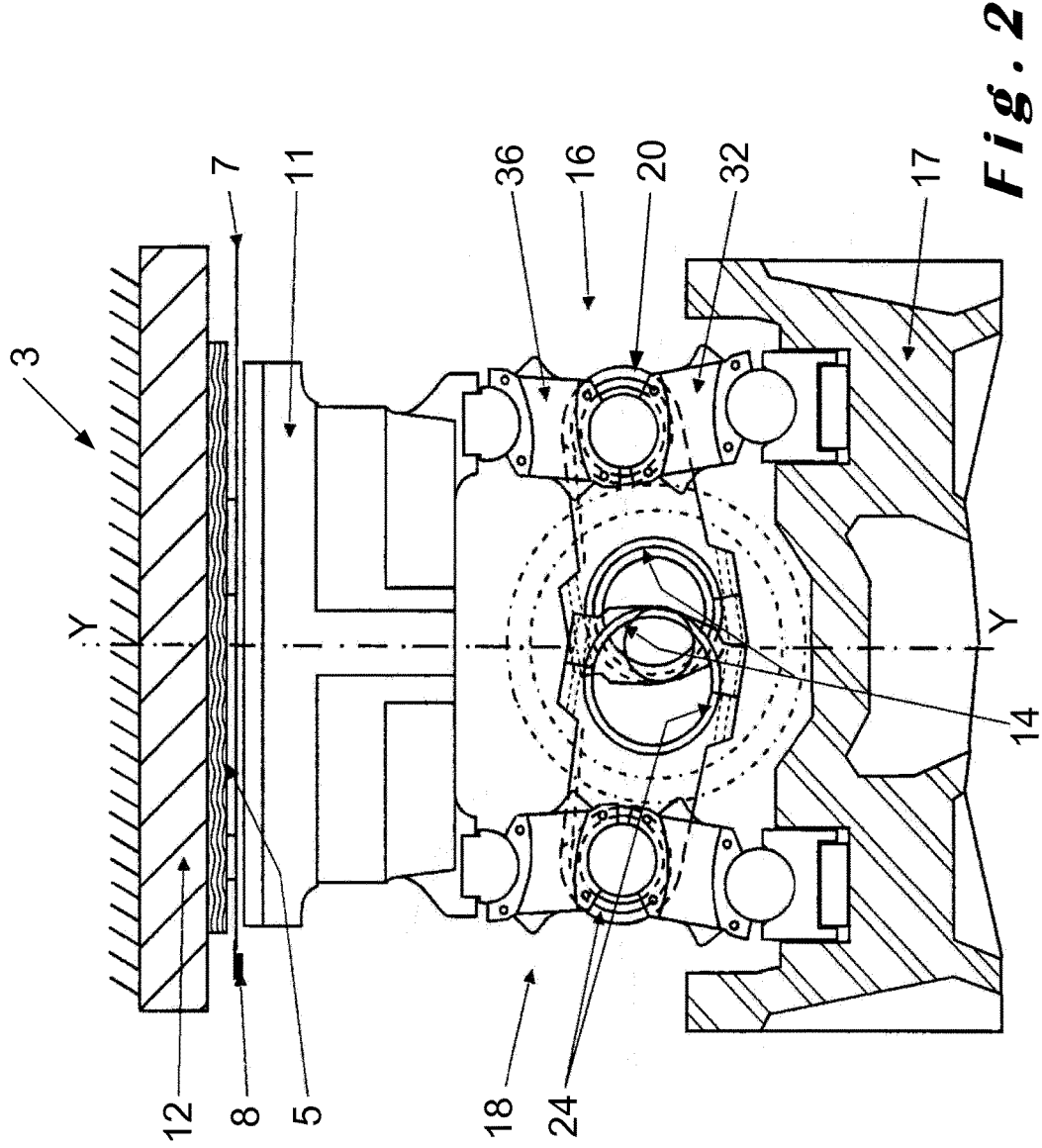

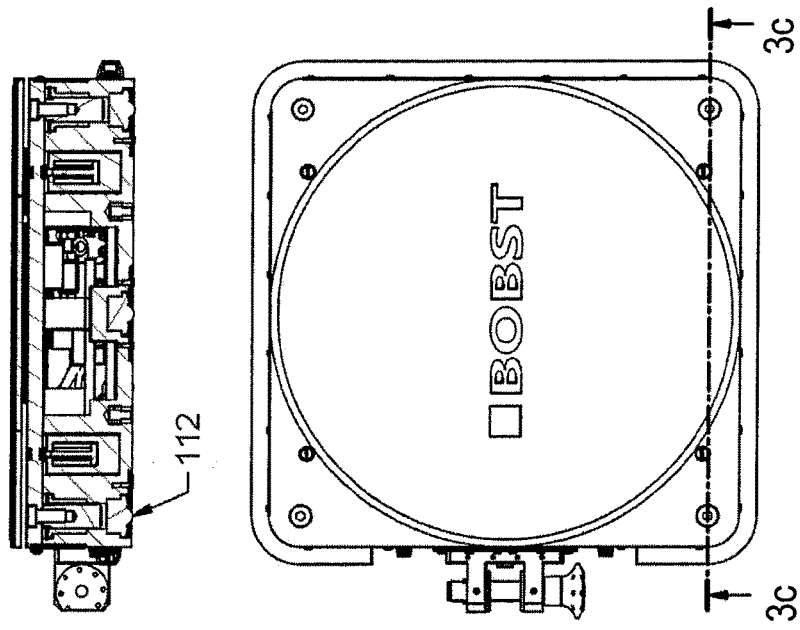
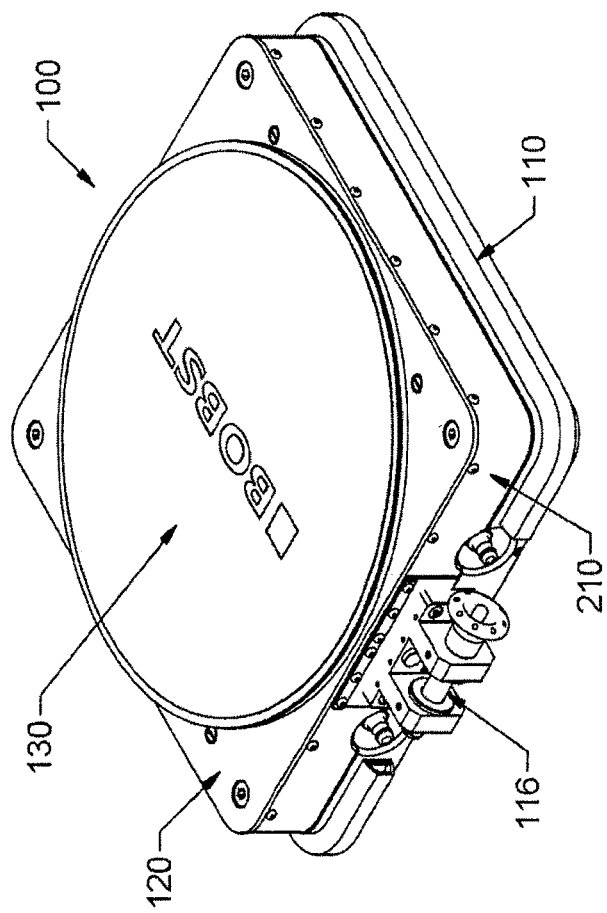

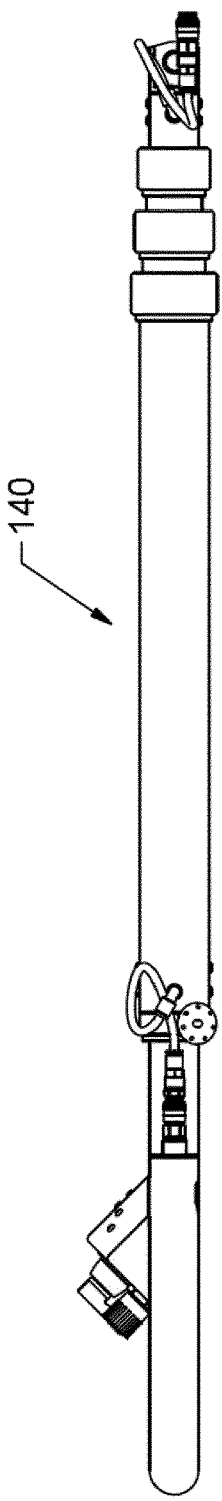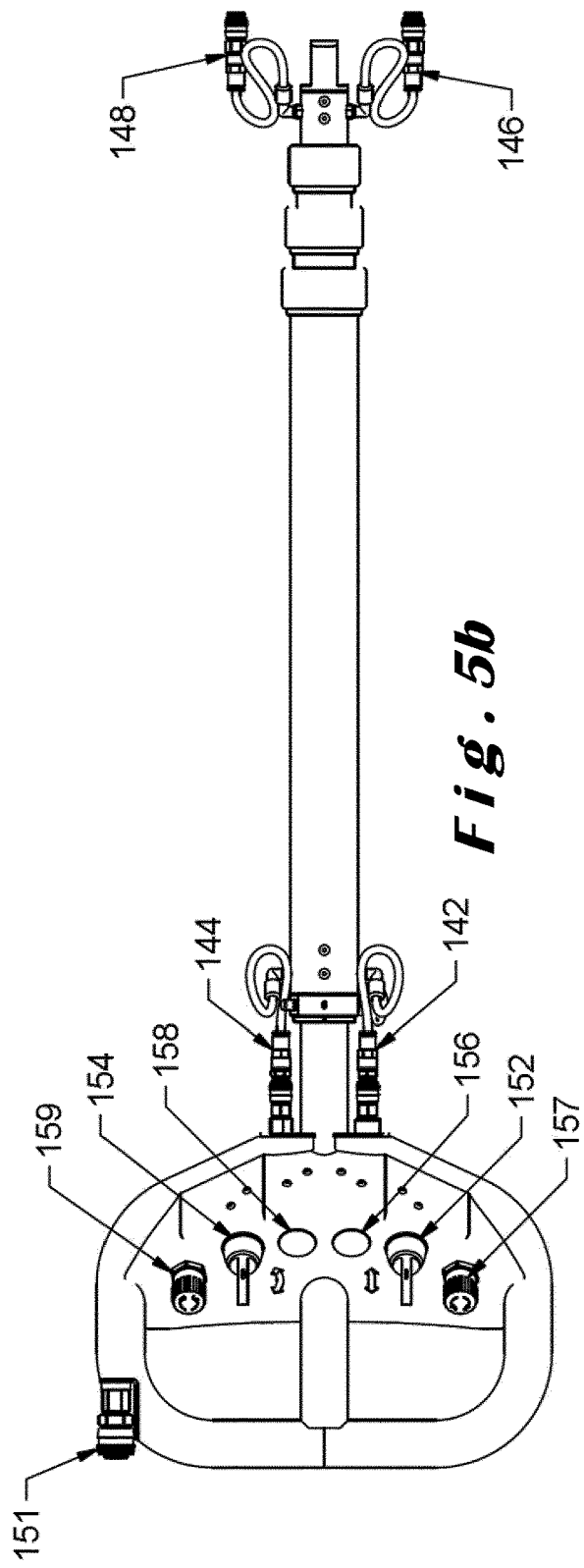
Fig. 5a
Fig. 5b

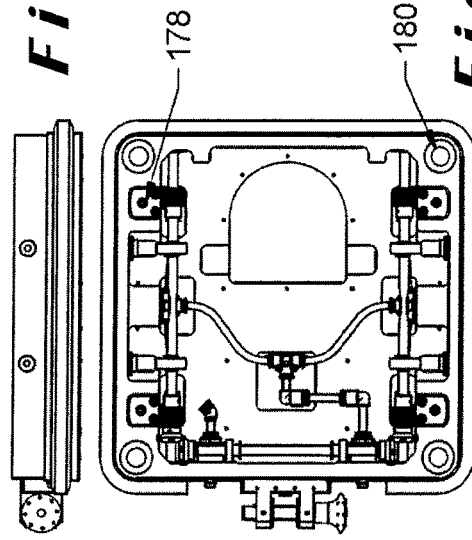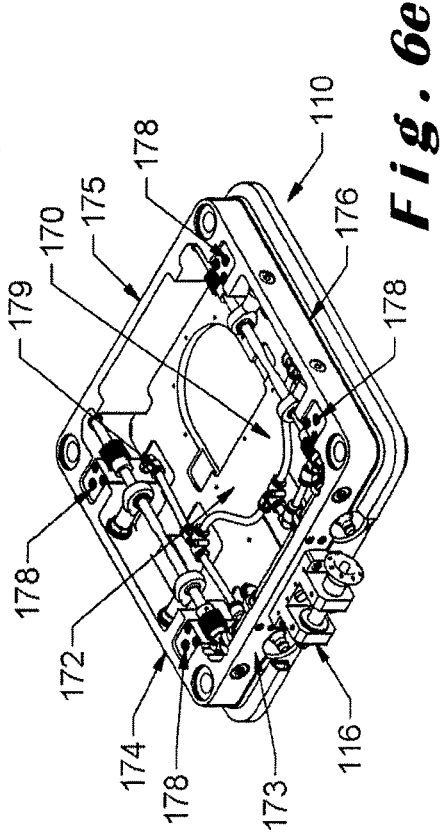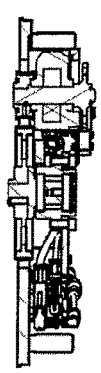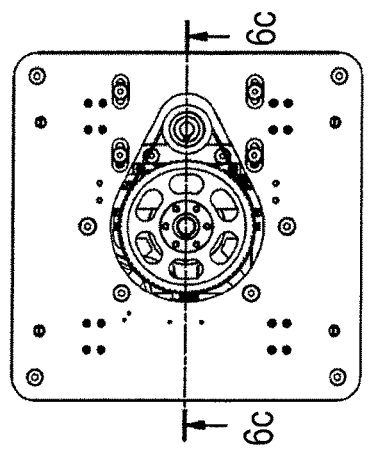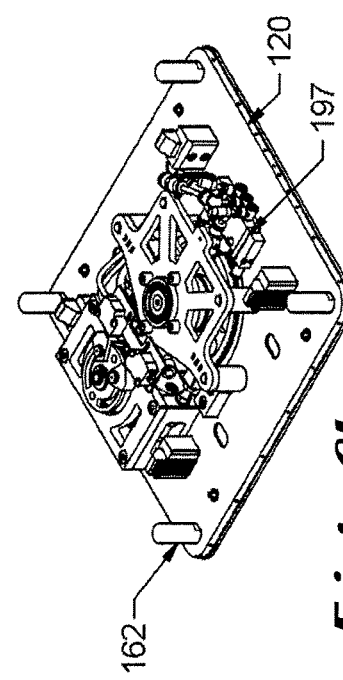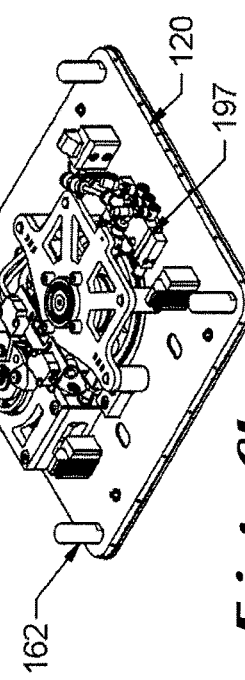

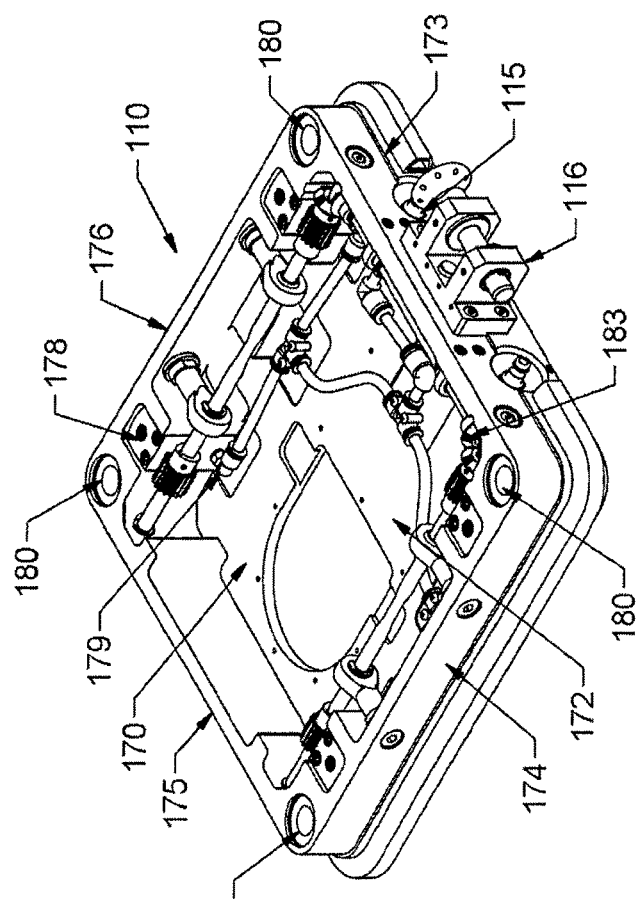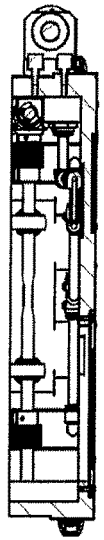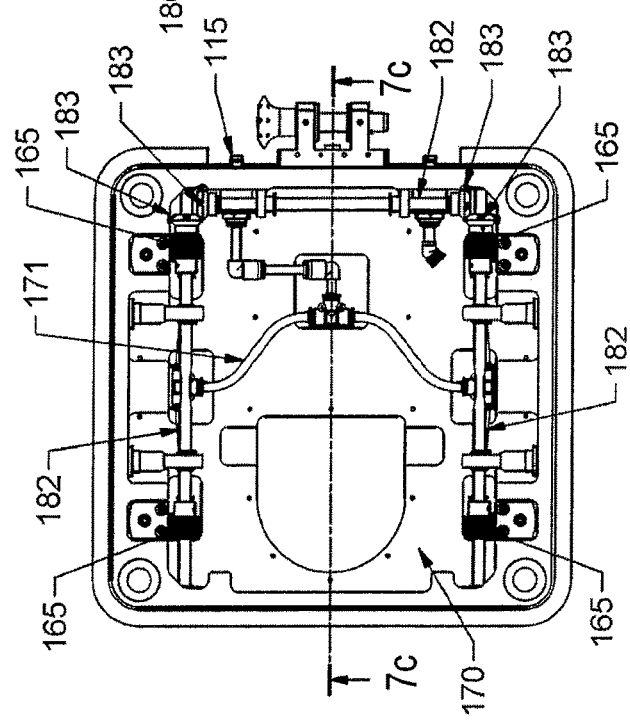

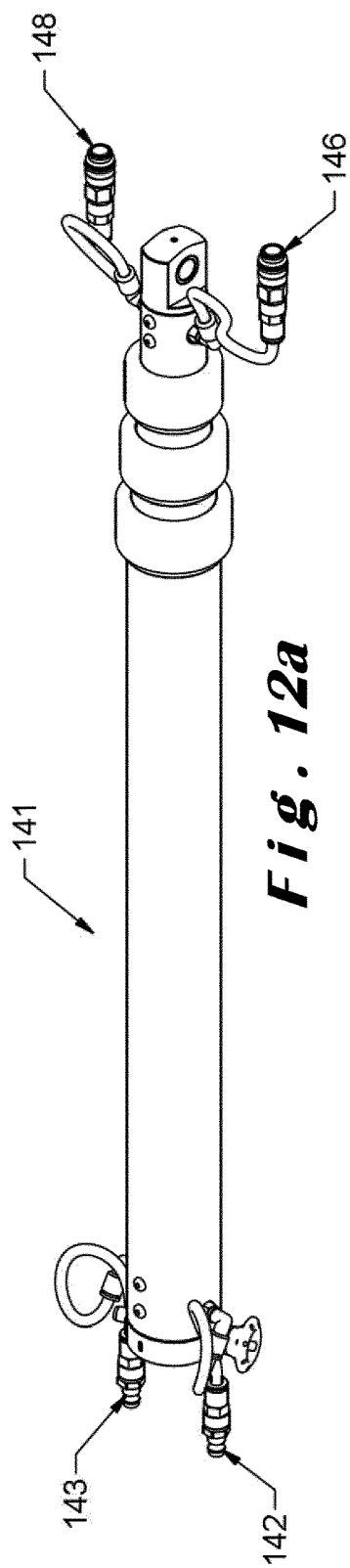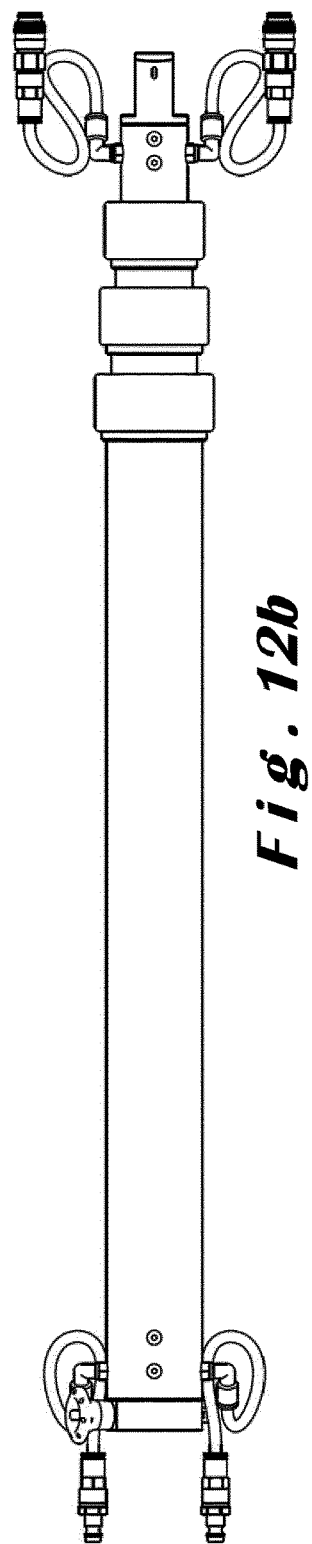
Fig. 12a
Fig. 12b

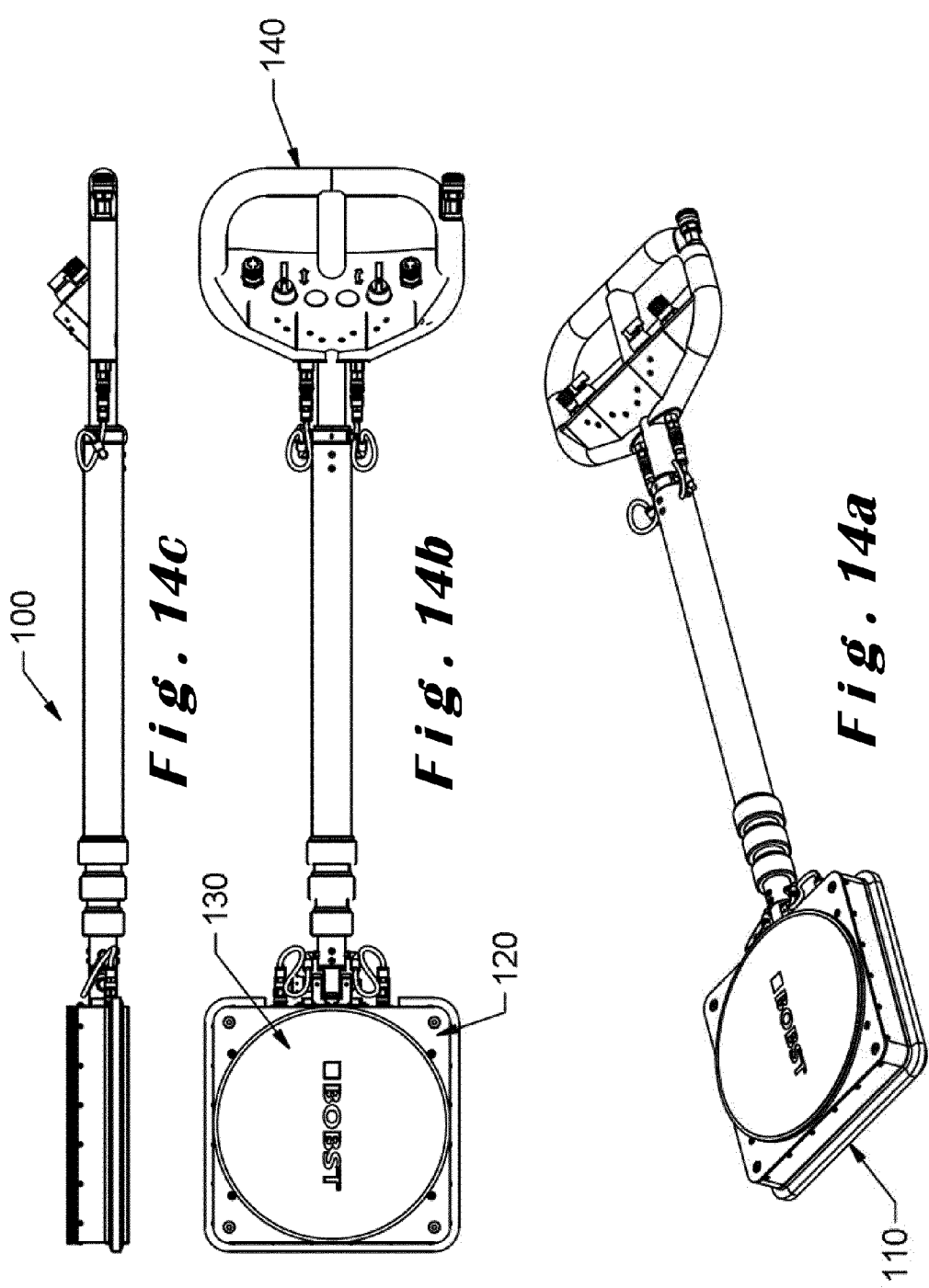

CLEANING DEVICE FOR A PROCESSING PLATEN PRESS

CROSS-REFERENCE TO RELATED APPLICATIONS

The present application is a 35 U.S.C. §§ 371 national phase conversion of PCT/EP2015/025009, filed Feb. 25, 2015, which claims priority of European Patent Application No. 14000694.1, filed Feb. 27, 2014, the contents of which are incorporated by reference herein. The PCT International Application was published in the English language.

The present invention relates to a device for cleaning a platen of a processing platen press, and more particularly the platens of a processing station for processing plate elements. The present invention further relates to a method for cleaning a platen in a processing platen press with a platen cleaning device.

BACKGROUND ART

Machines for processing plate elements between an upper and lower platen are known in the printing and packaging industry. US 2011/0286820 describes for example a cutting machine including a station for cutting plate elements with a cutting die. To obtain a quality cut, positioning of the plate element in the cutting station is crucial. U.S. Pat. No. 5,176,075 further describes a control mechanism for driving a movable lower platen in a platen press towards a fixed upper platen, the sheet materials being fed between them.

When a sheet material or plate element is to be cut between a lower and upper platen, it is crucial that the cutting die cuts through the sheet material or plate element over the whole length of the cutting die. A problem in above discussed systems is that the movement of the platen generates condensation of humidity in the air causing corrosion of the metal parts in the platen. The imperfections or uneven spots are causing problems for the quality of cutting because the cutting die is no longer cutting through the plate element over the whole length of the cutting die.

To resolve the quality issue, corrosion has to be removed as much as possible or corrections have to be made to the platens such that these imperfections or uneven spots are compensated. Therefore, corrosion over time affects the time needed to make a machine operational because additional set-up time is required. Further, cleaning the platen is very difficult and time consuming because the platens have large dimensions and the distance between the platens is relatively small.

DISCLOSURE OF THE INVENTION

It is an aim of the present invention to provide a solution for the above mentioned problems.

This aim is achieved according to the invention with a device for cleaning a platen of a processing platen press according to the invention. The platen press comprises a lower platen and an upper platen.
At least one is movable towards the other and at least one is arranged to allow tools to process a plate element which is fed between the lower platen and the upper platen. The device comprises:
 a frame having a base defining a substantially horizontal base plane,
 a lift member arranged to the frame such that a relative vertical movement can be executed between the frame and the lift member,
 pneumatic lifting means for moving the frame relative to the lift member, and
 a rotating element arranged on the lift member and configured to rotate around an axis substantially parallel to the vertical direction of the vertical movement.

By way of a non-exhaustive example, the plate element is defined as being in a board or sheet material, such as paper, flat board, corrugated cardboard, laminated corrugated cardboard, flexible plastic, for example polyethylene (PE), polyethylene terephthalate (PET), bi-oriented polypropylene (BOPP) or other polymers, or still other materials.

The plate element is subjected to a processing operation in the processing machine. The processing may be a cutting operation, if the processing machine is, by way of non-exhaustive example, a platen cutting machine. The processing may be an operation applied to the surface of the element, to apply graphic signs to it and/or to impart an aesthetic appearance to it. The processing may be an operation for creasing, embossing, structuring, hot foil stamping, affixing labels or holograms, or still others. This processed element could comprise a layer of varnish covering all or part of the surface.

With this device for cleaning a platen of a platen press, a user can easily clean the lower platen as well as the upper platen of a platen press. This solves problems identified in the state of the art. Compensation for imperfections generated by corrosion or all kind of manual cleaning operations are no longer needed. As a result, a lot of valuable set-up time is gained.

The device for cleaning a platen of a platen press further comprises pneumatic lifting means to execute the vertical relative movement between the frame and the lift member. Using a pneumatic lifting system for the relative vertical movement between frame and lift member has the advantage that limited space is needed to create high pressure on a surface to be cleaned. Furthermore, by changing the pressure of a compressed gas of the pneumatic lifting system, the pressure on the surface to be cleaned can be easily controlled. The control can further be done at a desired distance from the position where the pressure is created.

In another embodiment of the present invention, the frame comprises moving means for moving the frame relative to the platen towards which it is positioned. The moving means ensure that the device can be moved between the upper and lower platen when the device is executing a force on the cleaning surface.

In a further embodiment of the present invention, the moving means are at least three balls in ball bearings arranged in the frame such that the frame contacts a surface only with the balls when positioned on that surface.

This has the advantage that there is limited friction between the frame and the upper or lower platen which the frame is facing. This is especially useful when, in operation, the device is executing a pressure on the upper and lower platen.

In another embodiment of the present invention, the device for cleaning a platen of a platen press further comprises rotating means configured to use compressed gas to rotate the rotating element. The advantage of using a pneumatic rotation system is that control of the rotation forces can be done by controlling the pressure of the compressed gas. This creates a compact and reliable system.

In a further embodiment of the present invention, the rotating means is arranged to rotate the rotating element in an oscillation movement. The oscillation movement results in better cleaning such that less time is needed to execute a cleaning operation.

In another embodiment of the present invention, the device for cleaning a platen of a platen press further comprises a handle connected to the frame for moving the frame relative to the lower platen or the upper platen. The handle is very useful to clean relatively large surfaces with a limited space between upper and lower platen.

In a further embodiment of the present invention, the handle comprises a telescopic bar. Using a handle with a telescopic bar creates a lot of flexibility compared to a long or short handle. The handle can be configured long to reach for away areas, short to reach nearby areas, etc.

In another embodiment of the present invention, the handle comprises a hollow bar for guiding compressed gas towards the frame. Guiding the compressed gas within the handle avoids that the compressed gas hoses are getting damaged or that they get stuck during operation of the device.

In a further embodiment of the present invention, the handle comprises control means for controlling the lifting means and/or the rotating means. Having the control on the handle allows the user to control the lifting and/or rotating means during operation.

This structure has the advantage that the lifting is controllable independent from the rotation.

In another embodiment of the present invention, the control means comprises a first display element for displaying the pressure of the compressed gas for the lifting means. In a further embodiment of the present invention, the control means comprises a first controller to control the pressure of the compressed gas for the lifting means. This has the advantage that the pressure of the device on the upper and lower platen can be controlled.

In another embodiment of the present invention, the control means comprises a second display element for displaying the pressure of the rotating means. By displaying the pressure of the rotating element, the user is informed to control the control means.

In a further embodiment of the present invention, the control means comprises a second controller to control the pressure of the compressed gas for the rotating means.

It is another aim of the present invention to provide a method for cleaning a platen in a platen press. The method for cleaning a platen in a platen press using a platen cleaning device as described above comprises the steps of:
 positioning the device between the upper platen and lower platen of the platen press with the rotating element facing the platen to be cleaned;
 pneumatically increasing the width between the rotating element and frame such that the rotating element is pressed against the platen to be cleaned with a predetermined pressure;
 rotating the rotating element with respect to the platen to be cleaned, and
 moving the device over the platen to be cleaned.

The advantage of this method over methods for cleaning used in the state of the art is that the cleaning pressure is controlled, that difficult to reach areas are cleaned with the same pressure, that different cleaning materials can be used on the rotating element and that results are achieved fast. These are all advantages which improve quality and/or set-up time.

In another embodiment of the present invention, the method further comprises the step of providing cleaning product on the platen to be cleaned. Another advantage of the method is that different cleaning products can easily be used at different stages in the cleaning process. This improves the results.

The platen to be cleaned is the upper platen or the lower platen. An advantage of the cleaning method with the platen cleaning device is that the lower platen as well as the upper platen can be cleaned simply be positioning the device rotated over 180° between the upper and lower platen.

BRIEF DESCRIPTION OF THE DRAWINGS

The present invention will be described with respect to particular embodiments and with reference to certain drawings but the invention is not limited thereto but only by the claims. The drawings described are only schematic and are non-limiting. The invention will be further elucidated by means of the following description and the appended figures, in which:

FIG. 2 illustrates a processing station of a platen press in more detail;

FIGS. 3a, 3b and 3c show part of a platen cleaner according to an embodiment of the present invention respectively in a perspective view, a top view and a section view on line 3c of FIG. 3b;

FIGS. 5a and 5b show a handle of a platen cleaner in more detail respectively in a side and top view;

FIGS. 6a, 6b and 6c illustrate a lift member of a platen cleaner according to an embodiment of the invention respectively in a top view, a perspective view and a section view on line 6c of FIG. 3a;

FIGS. 6d, 6e and 6f illustrate a frame of a platen cleaner according to an embodiment of the invention respectively in a top, perspective and side view;

FIGS. 7a, 7b and 7c show a frame of a platen cleaner in more detail respectively in a perspective view, a top view and a section view on line 7c of FIG. 7b;

FIGS. 12a and 12b show a telescopic handle support bar of a platen cleaner respectively in a perspective and top view;

FIGS. 14a, 14b and 14c show an assembled platen cleaner according to an embodiment of the invention respectively in a perspective, top and side view.

MODES FOR CARRYING OUT THE INVENTION

Figure 1:
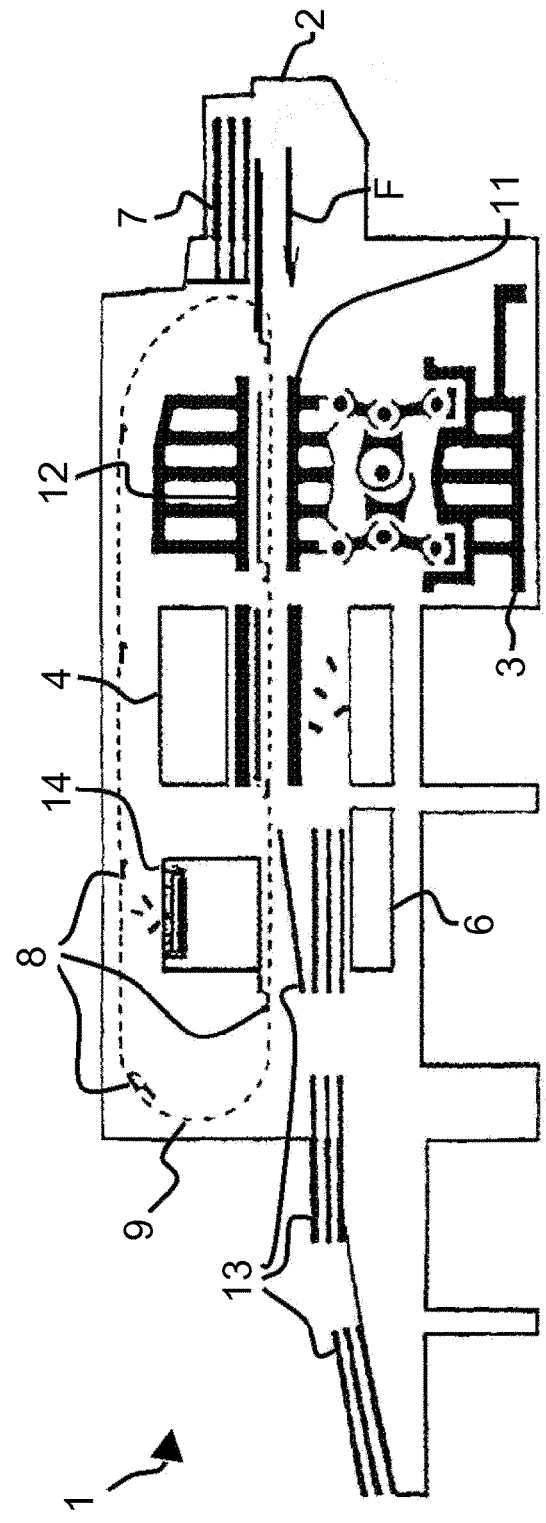
FIG. 1 illustrates a platen press in which a platen cleaner according to an embodiment of the present invention can be used.

FIG. 1 shows a machine for treating a plate element or sheet 7, more particular a platen press 1. The platen press comprises various stations: an infeed station 2, a cutting station 3, a waste stripping station 4 and a delivery station 6. The plate elements, i.e. the sheets of cardboard to be cut 7, are gripped and carried across the press 1 by a conveyor.

The conveyor is usually comprised of a gripping member, in the machine of FIG. 1 a series of grippers mounted on a transverse gripper bar 8 that can be secured to gripper bar chains 9 (represented in dotted lines in FIG. 1) driving the sheets to be cut 7 in the direction of Arrow F. The gripper bar 8 grips the sheet to be cut 7 that is in a predetermined intermediate position, and the gripper bar chains 9 bring the sheets in a rated running into the successive processing stations.

The gripper bar chains 9 are carried and stopped periodically in a rated running so that, during a carrying each gripper bar 8 with its sheet 7 is passed from an upstream station to the adjacent downstream station. The positions of the stops of the gripper bars 8 are imposed by a carrying of the gripper bar chains 9 over a constant distance.

Usually the cutter station 3 comprises a lower movable platen 11 to which are attached the cutting counter form, and an upper fixed platen 12, having a lower face on which the cutting tool is attached, or conversely a lower fixed platen and an upper movable platen. The cut sheet 13 is separated from the gripper bar 8 at the delivery station 6, where the gripper bar 8 is still holding the front waste. The delivery station 6 is surmounted by a conveyor tape 14 intended to evacuate the front wastes of the cut sheets 13. The cut sheets 13 are then discharged in a stack from the press 1.

Referring to FIG. 2, the cutter station 3 is described in more detail. The sheet to be cut 7 is carried by the gripper bar 8 between the fixed upper platen 12 and the vertically movable lower platen 11 of the platen press 1. In an alternative cutter station, the upper platen 12 may be movable or both may be movable. Once the sheet 7 is in position, the relative movement of the lower platen 11 and the upper platen 12 presses the sheet 7 in the blades 5 of the upper platen 12 such that the sheet 7 is die-cut in a size and shape defined by the pattern of the blades 5. The lower platen 11 rests on a bottom frame 17 by means of two knuckles 16 and 18 wherein each knuckle comprises an upper half-knuckle 36 and a lower half-knuckle 32. The knuckles 16 and 18 are moved by a connecting rod 20, 24 linked to a driven bit-stock 14.

FIGS. 3a-3c show a device, i.e. a platen cleaner 100 for cleaning the platen press 1 according to an embodiment of the invention. The platen cleaner 100 is used with the lower platen 11 in the open position. In this position, the height between the lower platen 11 and upper platen 12 is between 86 mm to 198 mm. The platen cleaner 100 comprises a frame 110, a lift member 120 and a rotating element 130. The platen cleaner 100 is arranged such that the lift member 120 can be moved vertically with respect to the frame 110 and the rotating element 130 can rotate with respect to the lift member 120 and thus also with respect to the frame 110.

The device 100 and the frame 110 comprise moving means for moving the frame 110 relative to the surface on which it is positioned. To do this, the frame 110 is provided with ball bearings, each ball bearing having a single ball 112. When the frame 110 is laid on a surface, only the balls 112 are contacting the surface. The balls 112 can rotate freely in the ball bearings allowing easy movement of the frame 110 and thus the platen cleaner 100 over a surface. The overall height of the platen cleaner 100 is smaller than the opening between the lower platen 11 and the upper platen 12 in their open position. In a preferred embodiment, the height of the platen cleaner 100 is lower than 85 mm.

Figure 8:
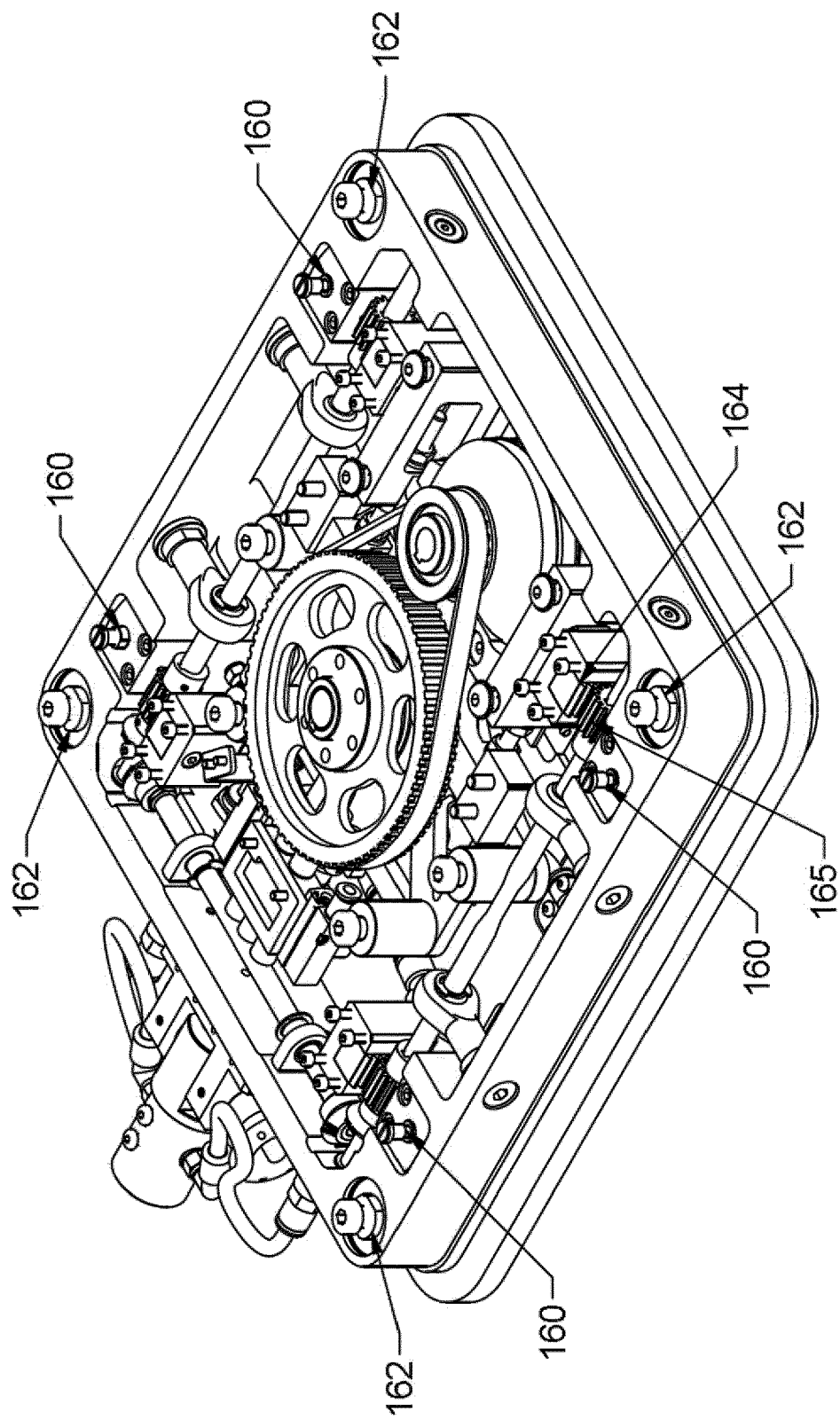
FIG. 8 shows a frame with some parts of the lift member added to it in the foreseen relative positioning for a platen cleaner according to an embodiment of the present invention in a perspective view.

Referring to FIGS. 6a-6e, 7a-7c and 8, the frame 110 comprises a frame body 170 with a base 172 and four sidewalls 173, 174, 175 and 176. The platen cleaner 100 comprises lifting means in the form of four pneumatic cylinders 178 that are provided in the sidewalls. In the embodiment of FIGS. 6 to 8, two pneumatic cylinders 178 are provided in sidewall 174 and two pneumatic cylinders 178 are provided in sidewall 176. In alternative embodiments, other configurations of the pneumatic cylinders 178 are possible. Each pneumatic cylinder 178 has a cylinder input 179 and uses the power of compressed gas to create a linear motion. The four cylinder inputs 179 are connected by an internal pressure hose network 171 to a first compressed gas input 115. The pneumatic cylinders 179 each have a piston rod 160 to transfer the force to the lift member 120.

The frame 110 further comprises four guiding cylinders 180. The axis of each guiding cylinder 180 is positioned perpendicular to the frame base 172. The guiding cylinders 180 will guide guiding bars 162 of the lift member 120 during relative movement of the lift member 120 and the frame 110.

Referring to FIGS. 7a-7c and 8, the inside of the frame further comprises three shafts 182 connected to the side walls of the frame body 170. On the shafts 182 are four pinions 165 which can freely rotate around the shafts. The pinions 165 are provided to come in contact with a rack 164 of the lift member 120 during relative movement of the lift member 120 and the frame 110. The three shafts 182 are positioned in a U-configuration on the frame body 170 and, where two shafts 182 are forming a corner, both shafts 182 have on their end a bevel gear 183.

Thus, the lift system has four pneumatic cylinders 179 with piston rods 160 assembled in the four corner areas of the frame 110. Four guiding cylinders 180, also assembled in the corner areas of the frame 110, together with a synchronizing mechanism ensure that the cleaning surface moves parallel to the frame 110. The synchronizing mechanism comprises the four racks 164 and pinions 165 in combination with the structure of shafts 182 and bevel gears 183.

Figure 9A:
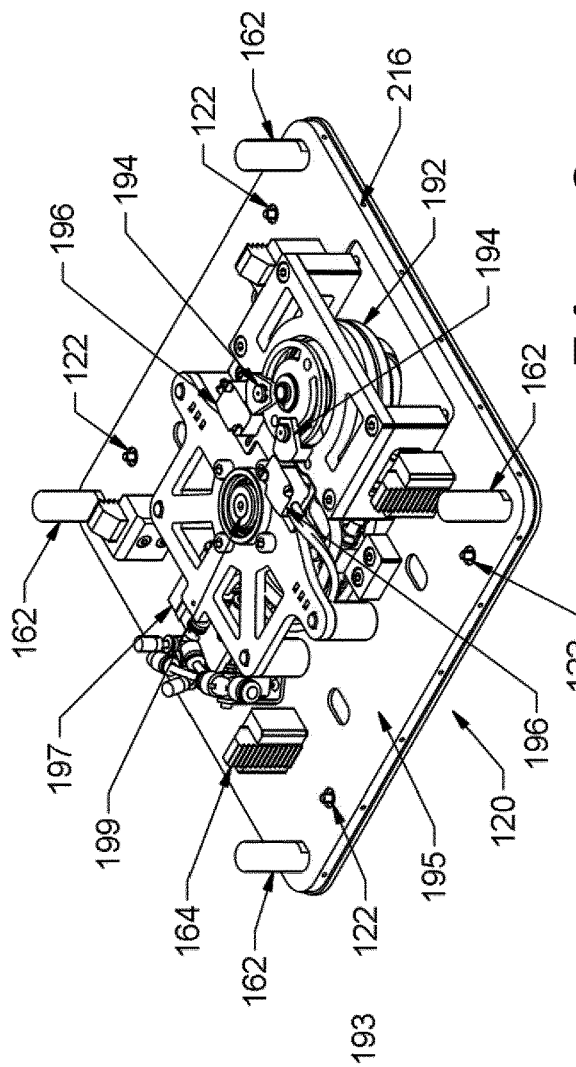
FIGS. 9a, 9b and 9c show a lift member of a platen cleaner in more detail respectively in a perspective, top and side view.
Figure 9C:
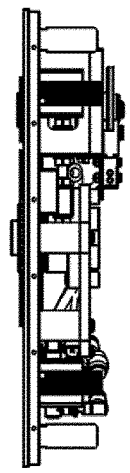
Figure 9B:
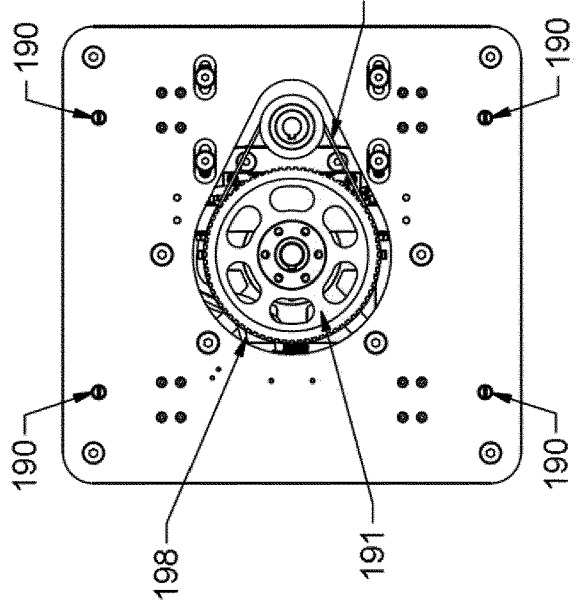

Referring to FIGS. 9a-9c, the lift member 120 in a platen cleaner according to an embodiment of the invention is illustrated in more detail. The lift member 120 has in the corner areas the four guiding bars 162 corresponding to the positions of the guiding cylinders 180 in the frame body 170. The lift member 120 further has 4 holes 122 to receive screws 190 to connect the lift member 120 to the piston rods 160. The racks 164 are positioned on the base plate 195 of the lift member 120 to correspond with the pinions 165 of the frame 110.

The lift member 120 further comprises the driving mechanism for rotating the rotating element 130. A pneumatic oscillation cylinder 192 is provided on the base plate 195 of the lift member 120 and a hose network is providing compressed gas towards the pneumatic oscillation cylinder 192. A control valve 197 is controlling rotation to the right or to the left depending on which side of the control valve 197 is providing compressed gas to the pneumatic oscillation cylinder 192. The oscillation angle is controlled by an oscillation angle setting 194. The oscillation angle is in the range 0-180°.

The oscillation cylinder 192 is provided with cam switches 196. These cam switches 196 are switching the control valve 197 causing to change the rotation direction of the pneumatic oscillation cylinder 192. By this continuously switching process, oscillation cylinder 192 is making continuously an oscillating movement as long as the compressed gas is provided to the pneumatic oscillation cylinder 192. The flow of compressed gas towards the oscillation cylinder 192 is controlled by an on/off switch on the handle as will be discussed in more detail below.

The driving mechanism further comprises a relatively central bearing 199 for mounting the rotating element 130. While the above discussed driving mechanism, guide bars 162, racks 164, etc. are assembled on one side of the base plate 195, the rotating element 130 is mounted to the bearing 199 on the other side of the base plate 195. For this, the base plate 195 has a central opening 198. The bearing 199 is also provided with a gear wheel 191. The gear wheel 191 is in his turn connected by a belt 193 with the pneumatic oscillation cylinder 192. In this way, the continuous oscillation movement of the cylinder 192 is transferred to the gear wheel 191, and thus to the rotating element 130. A belt tensioner may be provided to control the belt tension for optimal power transmission. The belt transmission between the gear wheel 191 and the cylinder 192 may have a ratio of three. This ratio three transmission results in a decrease of the oscillation angle by a factor of three, but increases the cleaning force of the rotating element 130 by the same factor. The cleaning force can further be controlled by the pressure of the compressed gas towards the lift system. A pressure control switch is provided on the handle to do so. This will be discussed in more detail below.

Figure 10:
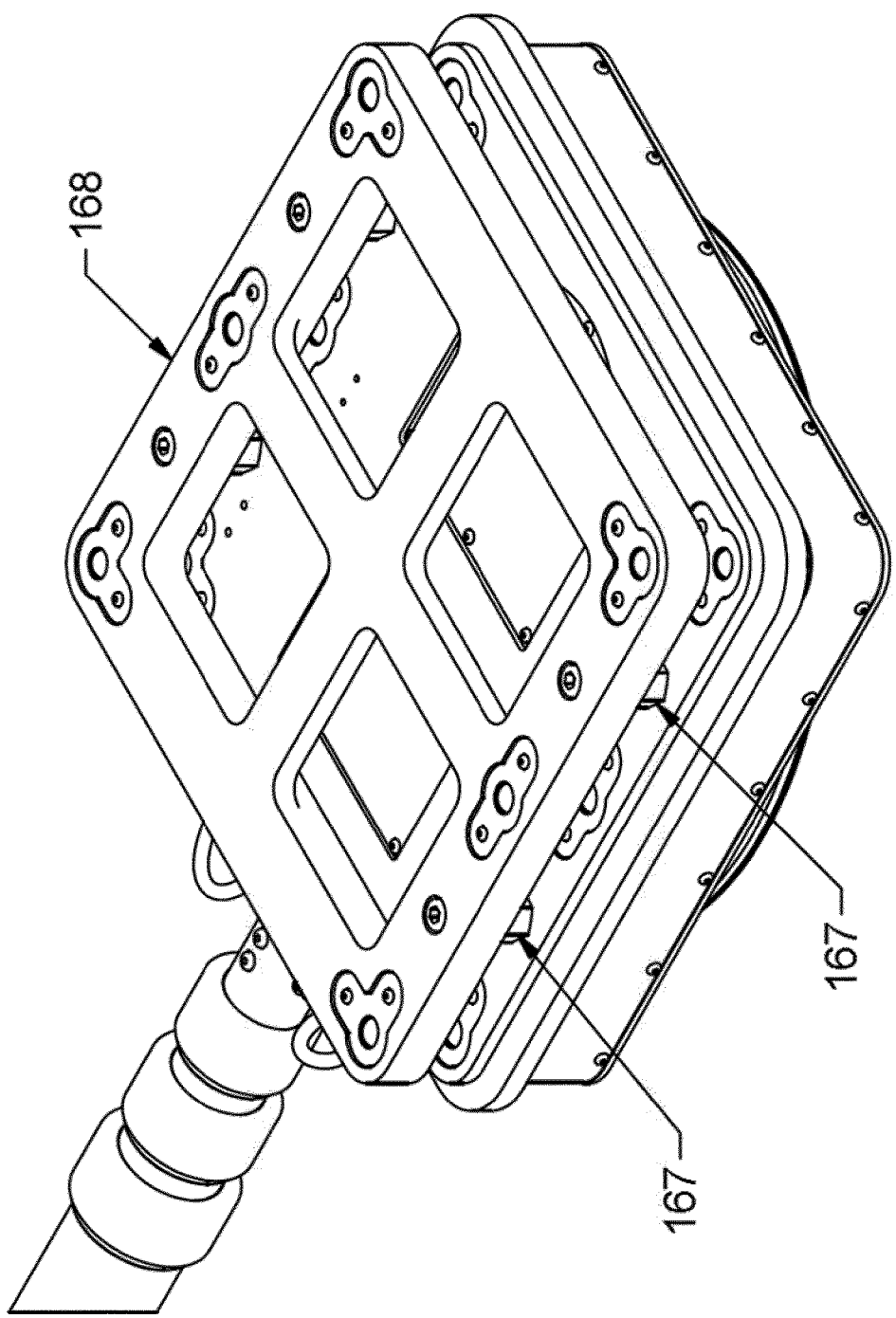
FIG. 10 shows a frame with a frame support in a perspective view.

Referring to FIG. 10, the pneumatic lift system according to an embodiment of the invention has a maximum lift distance of 25 mm. As mentioned above the height between the lower platen 11 and the upper platen 12 may vary between 86 mm to 198 mm which is much more than 25 mm. Therefore, in an embodiment of the invention illustrated in FIG. 10, the platen cleaner 100 is provided with frame support parts 167 mounted on the frame 110 on the side of the ball bearings and a support frame 168 is mounted to the frame support parts 167. This increases the overall height of the platen cleaner 100. The frame support part 167 has similar ball bearings with each having a single ball. In the embodiment of FIG. 10, the frame support part 167 has 6 ball bearings. In alternative embodiments there may be more or less. The frame support parts 167 are typically provided in heights of 20, 40, 60, 80, 100 and 120 mm, but other heights are possible as well. The support frame 168 can also be assembled directly on the frame 110 without frame support parts 167. With the frame support parts 167 and the support frame 168, it's possible to use the same platen cleaner 100 for platen presses 1 with a large variety of heights between the lower platen 11 and the upper platen 12.

The rotating element 130 is provided with means to attach a cleaning material on the rotating element 130. In an embodiment of the invention, the rotating element 130 is provided with a hook-and-loop fastener, also called touch fastener. In that way a desired cleaning material can easily be provided on the rotating element 130 and replaced by a new or different one with different cleaning properties. In a preferred embodiment the rotating element 130 has a diameter of 300 mm.

Figure 4A:
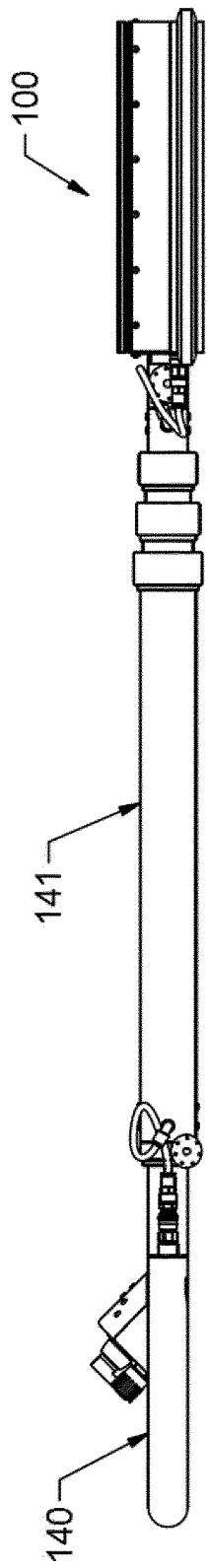
FIGS. 4a and 4b show a platen cleaner with handle according to an embodiment of the present invention respectively in a side and top view.
Figure 4B:
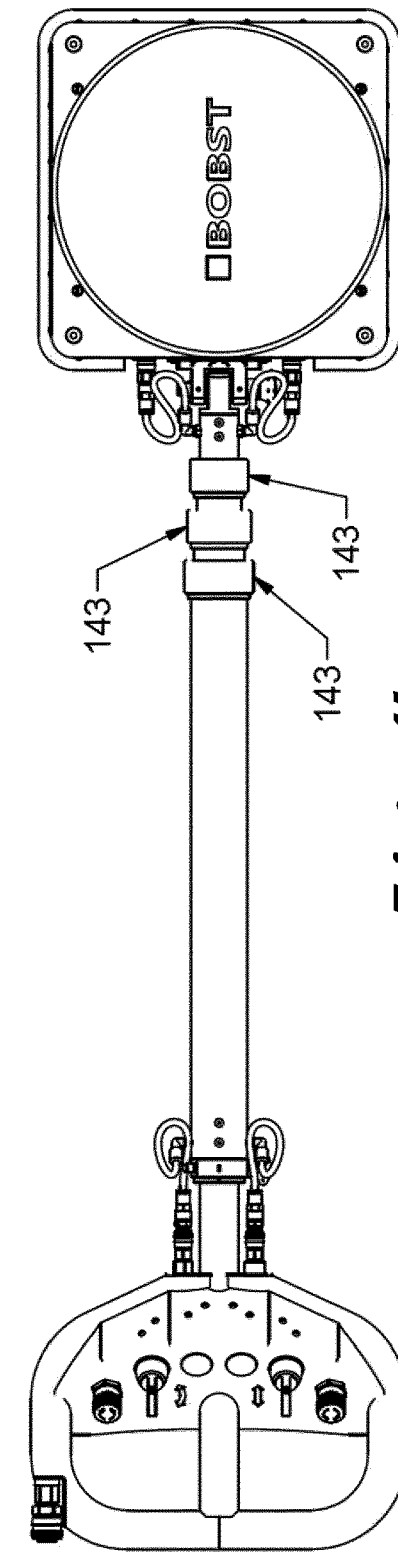

Referring to FIGS. 4a, 4b, 5a and 5b, 11 and 12a and b, the platen cleaner 100 in an embodiment of the invention has a handle 140 with a telescopic support bar 141. The frame 110 has a handle support 116 and the handle 140 may be connected to the handle support 116 by a snap connection. In alternative embodiments, alternative connections may be used, such as a connection with a shaft, bar or pin. The telescopic support bar 141 has a telescopic structure with multiple parts moving over each other. In the embodiment of FIGS. 4a and 4b, the telescopic support bar 141 has four parts. In alternative embodiments, there can be more or less parts. The relative positioning of the sliding parts of the telescopic support bar 141 is systematically locked and unlocked before and after a sliding in or out movement. This may for example be executed by an insert or a bolt-nut connection.

In the embodiment of FIG. 4 however this is executed by rotation of a knurled nut 143 on the larger bar of the two bars which slide with respect to each other. Rotating the knurled nut 143 such that the nut 143 is moving more on the larger bar fixes the bars relative to each other. Rotating the knurled nut 143 on the large bar such that the nut is moving towards the end of the larger bar, releases the bars relative to each other. Sliding the parts of the telescopic bar out of each other will make the handle 140 longer, sliding them back in each other will make the handle 140 again shorter. In this way the handle 140 can be customized during executing the cleaning action to operate always with the perfect length of the handle 140. A further advantage of the telescopic bar 141 is that the size for transporting is smaller.

The handle 140 is shown in isolation in FIGS. 5a and 5b. On both sides of the telescopic support bar 141 are two compressed gas connectors 142, 144 respectively 146, 148 provided. These connectors are connected in the hollow structure of the telescopic bars by two compressed gas hoses. The first compressed gas hose is connecting compressed gas connector 142 with compressed gas connector 146. The second compressed gas hose is connecting compressed gas connector 144 with compressed gas connector 148.

The first and second compressed gas hoses are constructed such that they enlarge when the telescopic bars are slid out of each other and the length of the compressed gas hoses shortens again when the telescopic bars are slid in each other. This is realized by providing the compressed gas hoses shaped as a spiral over the length of the telescopic bars when slid in. In that way, the spiral shaped compressed gas hoses can elongate as the telescopic bars are slid out. In an alternative embodiment the compressed gas hoses may not be provided in the bars but simply guided outside the telescopic support bar towards the frame 110 of the platen cleaner 100.

Figure 11:
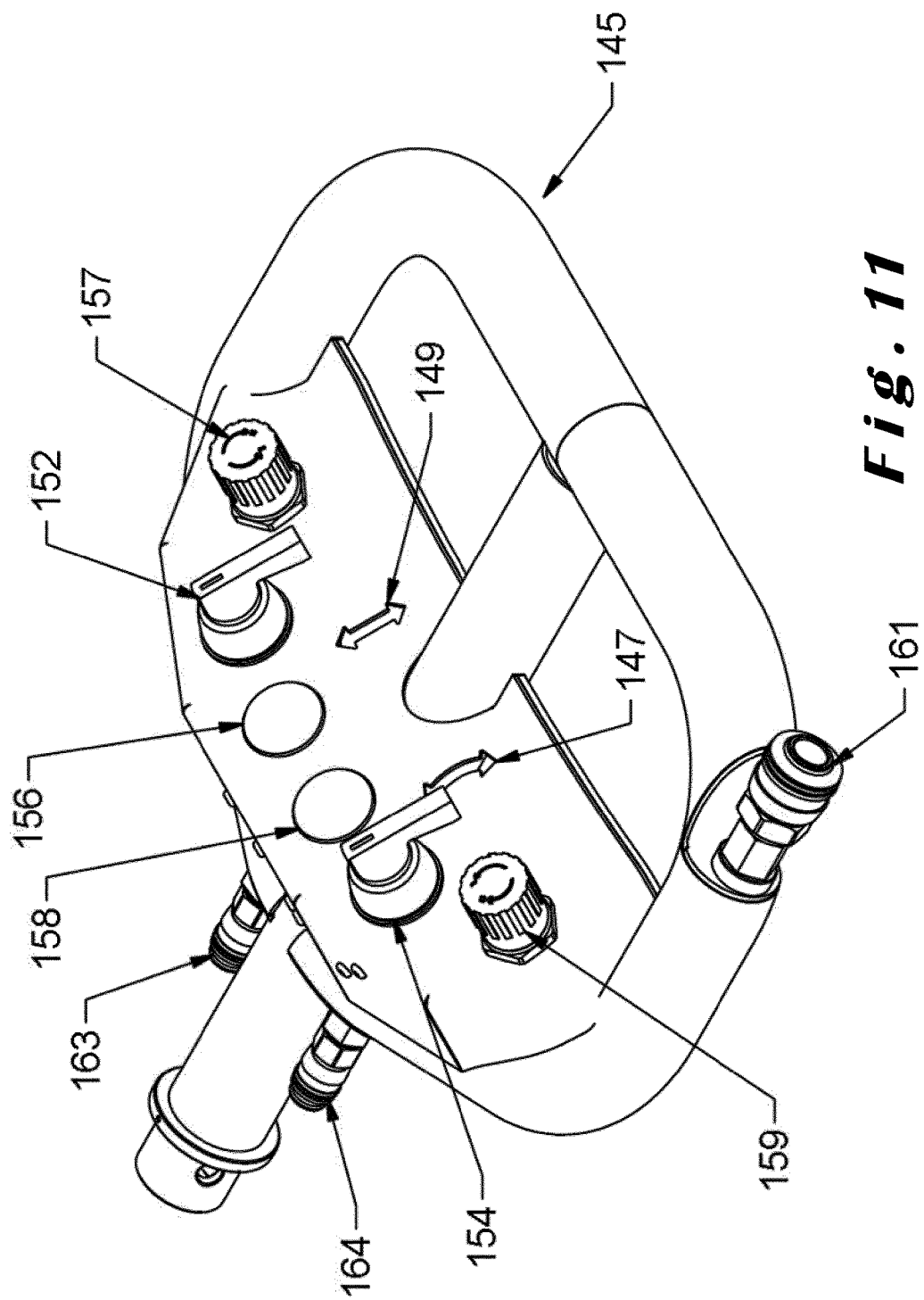
FIG. 11 shows a handle top part of a platen cleaner in a perspective view.

With reference to FIGS. 11, 12a and 12b, the handle 140 may have a separable handle top 145 which provides control functionality to the user and which connects to a support bar 141. In alternative embodiments the handle top 145 and the handle support bar 141 may be not separable. The handle top 145 provides control of the lift system as well as the driving mechanism. The control of the driving mechanism is indicated on the handle top 145 by a bent arrow 147 referring to the rotational movement. The control of the lift system is indicated on the handle top 145 by a straight arrow 149 referring to the translation movement.

The compressed gas hose circuits for the lift system and driving mechanism are further also completely separated and both hose circuits have their own color code, for example black for the hose circuit of the lift system and blue for the hose circuit of the driving system. Both hose circuits are further provided with a pressure controller or regulator 157 and 159, respectively for the lift system circuit and the driving mechanism circuit. In an alternative embodiment, there can be one pressure regulator for both circuits and/or parts of the circuits may be shared.

In the embodiment of FIG. 11, with a pressure regulator 157 and 159 for each hose circuit, the operation pressure of each hose circuit can be controlled separately which allows optimal pressure in both hose circuits. The pressure regulator of the lift systems 157 controls the pressure of the rotating element 130 perpendicular on the cleaning surface.

The pressure regulator of the driving mechanism 159 controls the rotation force of the rotating element 130 in the contact plane between the rotating element 130 and the cleaning surface.

Next to each pressure regulator 157 and 159, is provided respectively display elements, i.e. manometer 156 and 158 to display the pressure of each hose circuit to the user, and on/off switches 152 and 154 for opening and closing both hose circuits. The handle top 145 is further provided with a main compressed gas input 161. In a preferred embodiment, the compressed gas is compressed air. Via an internal hose network in the handle top 145, the input compressed gas is guided from the main input 161 to two compressed gas output connectors 163 and 164.

Figure 13:
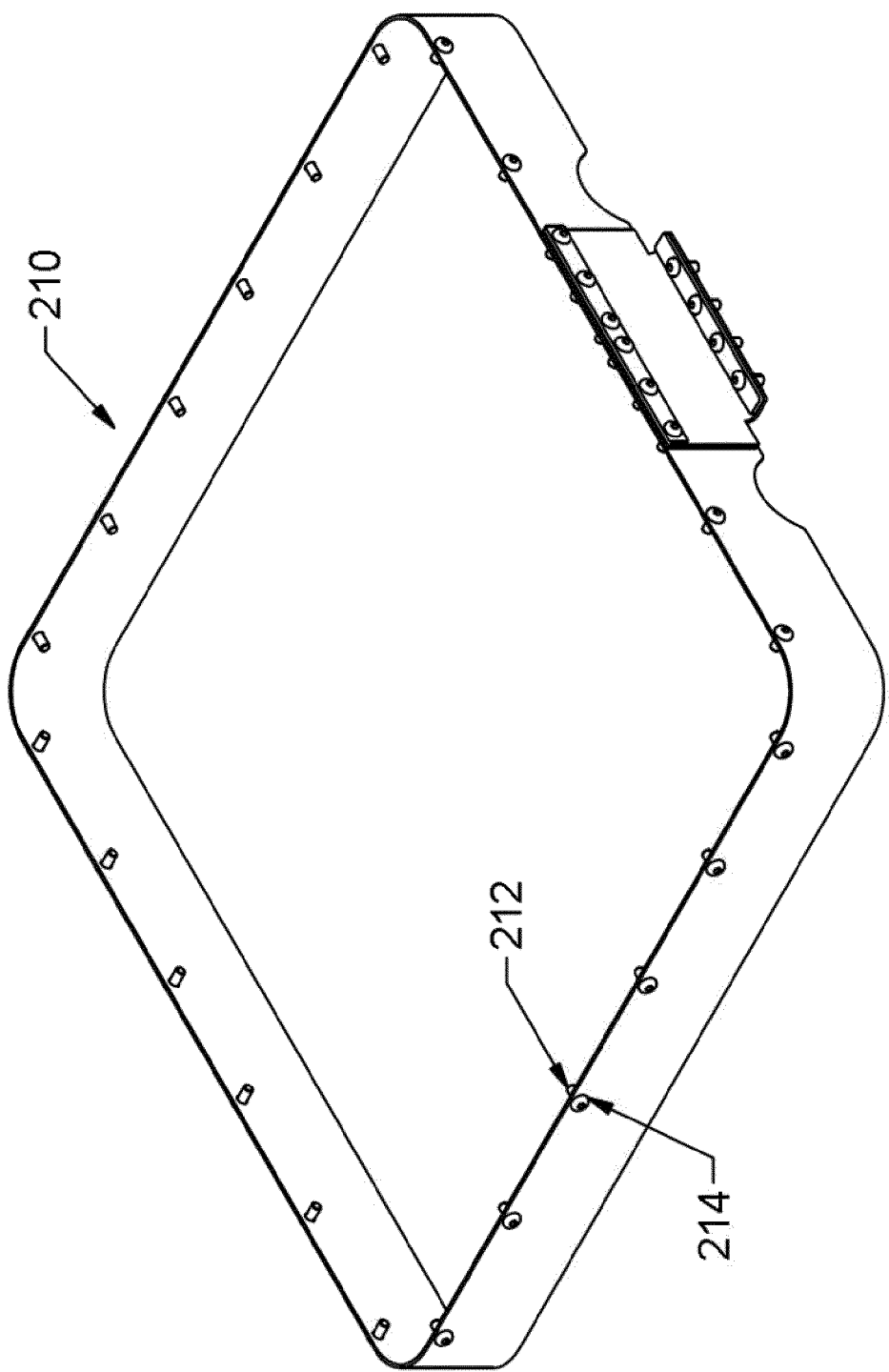
FIG. 13 shows a safety part of a frame of a platen cleaner according to an embodiment of the invention.

Referring to FIGS. 13 and 14a, b and c, in an embodiment of the invention the platen cleaner 100 may have a skirt 210 mountable on the lift member 120. The main part of the skirt is comprised of a bent metal plate to form a shape corresponding to the outside walls of the lift member 120. By having this shape, the skirt 210 can be moved partly over the side of the base plate 195 of the lift member 120. The skirt 210 is fixed to the lift member 120 by providing screws 212 through holes 214 in the skirt 210 corresponding to holes 215 in the base plate 195. The holes 216 in the base plate 195 are visible in FIG. 9. The skirt 210 further has an L-part. The L-part is mainly made of rubber and is connected to the main part of the skirt by screws. At the position of the screws, a small plate is positioned between the screws and the rubber to avoid that the screws are damaging the rubber. The other side of the L-part is connected to the handle support 116 of the frame 110. The connection between the L-part and the handle support 116 is also by screws and a small plate to avoid damaging the rubber. The rubber L-part is stretched maximal when the lift member 120 is moved maximal relative to the frame 110. When the lift member 120 is moving back towards its start position, the rubber L-part is unstretched towards its initial size and shape. The skirt 210 is provided to avoid that dirt of the cleaning is moving into the mechanism of the device 100.

Furthermore, the various embodiments, although referred to as preferred are to be construed as exemplary manners in which the invention may be implemented rather than as limiting the scope of the invention.

The invention claimed is:

1. A device for cleaning a platen of a processing platen press, wherein
the processing platen press comprises a lower platen and an upper platen, at least one of the platens is movable toward or away from the other of the platens and at least one of the platens is arranged to allow tools to process a plate element fed between the lower and the upper platen;
the device comprising:
a frame having a base defining a base plane substantially parallel to a surface on which the frame is positioned; the frame comprises moving elements configured for moving the frame relative to the surface on which the frame is positioned;
a lift member arranged at the frame and the lift member is configured such that a relative movement can be executed between the frame and the lift member in a direction substantially perpendicular to the base plane;
a pneumatic lifting device configured for moving the frame relative to the lift member; and
a rotating element arranged on the lift member and configured to rotate around an axis substantially parallel to the direction of relative movement between the frame and the lift member.

2. The device according to claim 1, further comprising the moving elements comprise at least three ball bearings, wherein each bearing comprises a single ball arranged in the frame such that only the balls contact a surface on which the device is positioned.

3. The device of claim 1, wherein the moving elements comprise two or more ball bearings.

4. A device for cleaning a platen of a processing platen press, wherein
the processing platen press comprises a lower platen and an upper platen, at least one of the platens is movable toward or away from the other of the platens and at least one of the platens is arranged to allow tools to process a plate element fed between the lower and the upper platen;
the device comprising:
a frame having a base defining a base plane substantially parallel to a surface on which the frame is positioned;
a lift member arranged at the frame and the lift member is configured such that a relative movement can be executed between the frame and the lift member in a direction substantially perpendicular to the base plane;
a pneumatic lifting device configured for moving the frame relative to the lift member;
a rotating element arranged on the lift member and configured to rotate around an axis substantially parallel to the direction of relative movement between the frame and the lift member; and
a pneumatic rotating device configured for rotating the rotating element.

5. The device according to claim 4, wherein the pneumatic rotating device is configured to rotate the rotating element in an oscillation movement.

6. A device for cleaning a platen of a processing platen press, wherein
the processing platen press comprises a lower platen and an upper platen, at least one of the platens is movable toward or away from the other of the platens and at least one of the platens is arranged to allow tools to process a plate element fed between the lower and the upper platen;
the device comprising:
a frame having a base defining a base plane substantially parallel to a surface on which the frame is positioned;
a lift member arranged at the frame and the lift member is configured such that a relative movement can be executed between the frame and the lift member in a direction substantially perpendicular to the base plane;
a pneumatic lifting device configured for moving the frame relative to the lift member;
a rotating element arranged on the lift member and configured to rotate around an axis substantially parallel to the direction of relative movement between the frame and the lift member; and
a handle connected to the frame and configured for moving the frame relative to the lower platen or the upper platen.

7. The device according to claim 6, wherein the handle comprises a hollow bar for guiding compressed gas towards the frame.

8. The device according to claim 7, wherein the bar is a telescopic bar;
the device further comprising first and second compressed gas hoses each configured to enlarge when the telescopic bars are slid outward of each other and to shorten when the telescopic bars are slid inward of each other.

9. The device according to claim 6, wherein the handle comprises a controller configured for controlling the lifting device, the rotating device or both.

10. The device according to claim 9, further comprising the controller comprises a first display element for displaying the pressure of the compressed gas for the lifting device.

11. The device according to claim 9, wherein the controller comprises a first controller to control the pressure of the compressed gas for the lifting device.

12. The device according to claim 9, wherein the controller comprises a second display element for displaying the pressure of the rotating device.

13. The device according to claim 12, wherein the controller comprises a second controller to control the pressure of the compressed gas for the rotating device.

14. A device for cleaning a platen of a processing platen press, wherein
the processing platen press comprises a lower platen and an upper platen, at least one of the platens is movable toward or away from the other of the platens and at least one of the platens is arranged to allow tools to process a plate element fed between the lower and the upper platen;
the device comprising:
a frame having a base defining a base plane substantially parallel to a surface on which the frame is positioned;
a lift member arranged at the frame and the lift member is configured such that a relative movement can be executed between the frame and the lift member in a direction substantially perpendicular to the base plane;
a pneumatic lifting device configured for moving the frame relative to the lift member; a rotating element arranged on the lift member and configured to rotate around an axis substantially parallel to the direction of relative movement between the frame and the lift member; and
a support frame received by the device for increasing the overall height of the platen cleaner.

15. A platen cleaning kit further comprising:
a device for cleaning a platen of a processing platen press,
wherein the processing platen press comprises a lower platen and an upper platen, at least one of the platens is movable toward or away from the other of the platens and at least one of the platens is arranged to allow tools to process a plate element fed between the lower and the upper platen;
the device comprising:
a frame having a base defining a base plane substantially parallel to a surface on which the frame is positioned;
a lift member arranged at the frame and the lift member is configured such that a relative movement can be executed between the frame and the lift member in a direction substantially perpendicular to the base plane;
a pneumatic lifting device configured for moving the frame relative to the lift member; and
a rotating element arranged on the lift member and configured to rotate around an axis substantially parallel to the direction of relative movement between the frame and the lift member;
and the platen cleaning kit further comprises,
one or more support frames configured to be attached to the device and configured to increase the overall height of the platen cleaner; and
the one or more support frames each comprise moving elements arranged and configured to allow the support frame to slide over a surface against which it is positioned.

16. The platen cleaning kit of claim 15, wherein the moving elements comprise two or more ball bearings.

* * * * *